(12) United States Patent
Liu et al.

(10) Patent No.: US 8,989,331 B2
(45) Date of Patent: Mar. 24, 2015

(54) METHOD AND SYSTEM FOR ADVANCE HIGH PERFORMANCE BUS SYNCHRONIZER

(75) Inventors: Sam H. Liu, Irvine, CA (US); Zhiqing Zhuang, Irvine, CA (US); Chaoyang Zhao, Irvine, CA (US); Vinay Bhasin, Irvine, CA (US); Chenmin Zhang, Irvine, CA (US); Lawrence J. Madar, III, San Francisco, CA (US); Vafa J. Rakshani, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 930 days.

(21) Appl. No.: 11/806,397

(22) Filed: May 31, 2007

(65) Prior Publication Data
US 2007/0280396 A1 Dec. 6, 2007

Related U.S. Application Data

(60) Provisional application No. 60/809,350, filed on May 31, 2006.

(51) Int. Cl.
*H04L 7/00* (2006.01)
*H04L 7/02* (2006.01)
*G06F 1/12* (2006.01)

(52) U.S. Cl.
CPC .. *H04L 7/02* (2013.01); *G06F 1/12* (2013.01); *H04L 7/0012* (2013.01)
USPC .......................................................... 375/372

(58) Field of Classification Search
CPC ........... H04L 7/00; H04L 7/02; H04L 7/0012; G06F 1/10; G06F 1/12
USPC ......... 375/219, 229, 295, 354, 358, 372, 376; 327/142, 144, 158, 162, 295
See application file for complete search history.

(56) References Cited

U.S. PATENT DOCUMENTS

| 4,761,732 | A * | 8/1988 | Eldumiati et al. | 710/263 |
|---|---|---|---|---|
| 4,860,285 | A * | 8/1989 | Miller et al. | 370/507 |
| 5,878,281 | A * | 3/1999 | Itoh et al. | 710/61 |
| 6,000,037 | A * | 12/1999 | Herbert | 713/400 |
| 6,055,285 | A * | 4/2000 | Alston | 375/372 |
| 6,956,788 | B1 * | 10/2005 | Nguyen et al. | 365/189.14 |
| 7,248,661 | B1 * | 7/2007 | Almog et al. | 375/358 |
| 7,352,836 | B1 * | 4/2008 | Mendenhall | 375/372 |
| 2003/0123588 | A1 * | 7/2003 | Parikh | 375/354 |
| 2004/0064748 | A1 * | 4/2004 | Syed | 713/400 |
| 2004/0223565 | A1 * | 11/2004 | Adkisson | 375/354 |
| 2004/0236893 | A1 * | 11/2004 | May et al. | 710/306 |
| 2005/0243903 | A1 * | 11/2005 | Agazzi | 375/219 |
| 2005/0286507 | A1 * | 12/2005 | Sterling et al. | 370/363 |
| 2006/0120498 | A1 * | 6/2006 | Wong et al. | 375/359 |
| 2006/0129728 | A1 * | 6/2006 | Hampel | 710/118 |

* cited by examiner

*Primary Examiner* — Syed Haider
(74) *Attorney, Agent, or Firm* — Sterne, Kessler, Goldstein & Fox P.L.L.C.

(57) ABSTRACT

Provided is a method for transferring data from one clock domain within a synchronizer to another domain within the synchronizer. The method includes determining system clock parameters within the synchronizer and analyzing a first domain clock signal based upon the system clock parameters. Next, a second domain clock signal is analyzed based upon the first domain clock signal and the system clock parameters. A determination is made as to when to transfer data from a first clock domain to a second clock domain in accordance with the analysis of the first and second domain clock signals, and an enable signal is provided to affect the data transfer from the first domain to the second clock domain.

19 Claims, 5 Drawing Sheets

METHOD AND SYSTEM FOR ADVANCE HIGH PERFORMANCE BUS SYNCHRONIZER

CROSS-REFERENCE TO RELATED APPLICATIONS

This application claims benefit to U.S. Provisional Application No. 60/809,350, filed May 31, 2006, which is incorporated herein in its entirety.

BACKGROUND OF THE INVENTION

1. Field of the Invention

The invention generally relates to synchronizers. More particularly, the present invention relates to advanced high performance bus (AHB) synchronizer designs.

2. Background Art

Conventional synchronizer designs provide solutions for transferring data from one clock domain to another clock domain where the two clock domains have a 1:N synchronized or a totally unsynchronized relationship. These solutions, however, cannot accommodate systems where the clocks have an N:M relationship. Furthermore, these conventional systems do not preserve burst operations or burst operations are blindly preserved without optimizing system performance.

What is needed therefore, is an advanced high performance bus (AHB) design capable of transferring data from one clock domain to another clock domain independent of the relationship of the domain clocks. More specifically, what is needed is an AHB synchronizer design capable of preserving the burst while transferring data from one clock domain to another clock domain where the associated clocks have an N:M relationship. Such a synchronizer design is desirably configurable for either minimum latency or maximum throughput mode.

BRIEF SUMMARY OF THE INVENTION

Consistent with the principles of the present invention, as embodied and broadly described herein, the present invention includes a method for transferring data from one clock domain within a synchronizer to another domain within the synchronizer. The method includes determining system clock parameters within the synchronizer and analyzing a first domain clock signal based upon the system clock parameters. Next, a second domain clock signal is analyzed based upon the first domain clock signal and the system clock parameters. A determination is made as to when to transfer data from a first clock domain to a second clock domain in accordance with the analysis of the first and second domain clock signals, and an enable signal is provided to affect the data transfer from the first domain to the second clock domain. The same is applied to data transfers from the second clock domain back to the first clock domain.

Further features and advantages of the present invention are provided as well as the structure and operation of various embodiments of the present invention, as described in detail below with reference to the accompanying drawings.

BRIEF DESCRIPTION OF THE DRAWINGS/FIGURES

The accompanying drawings, which are incorporated herein and constitute part of the specification, illustrate embodiments of the present invention and, together with the general description given above and the detailed description of the embodiments given below, serve to explain the principles of the invention. In the drawings.

DETAILED DESCRIPTION OF THE INVENTION

Figure 1:
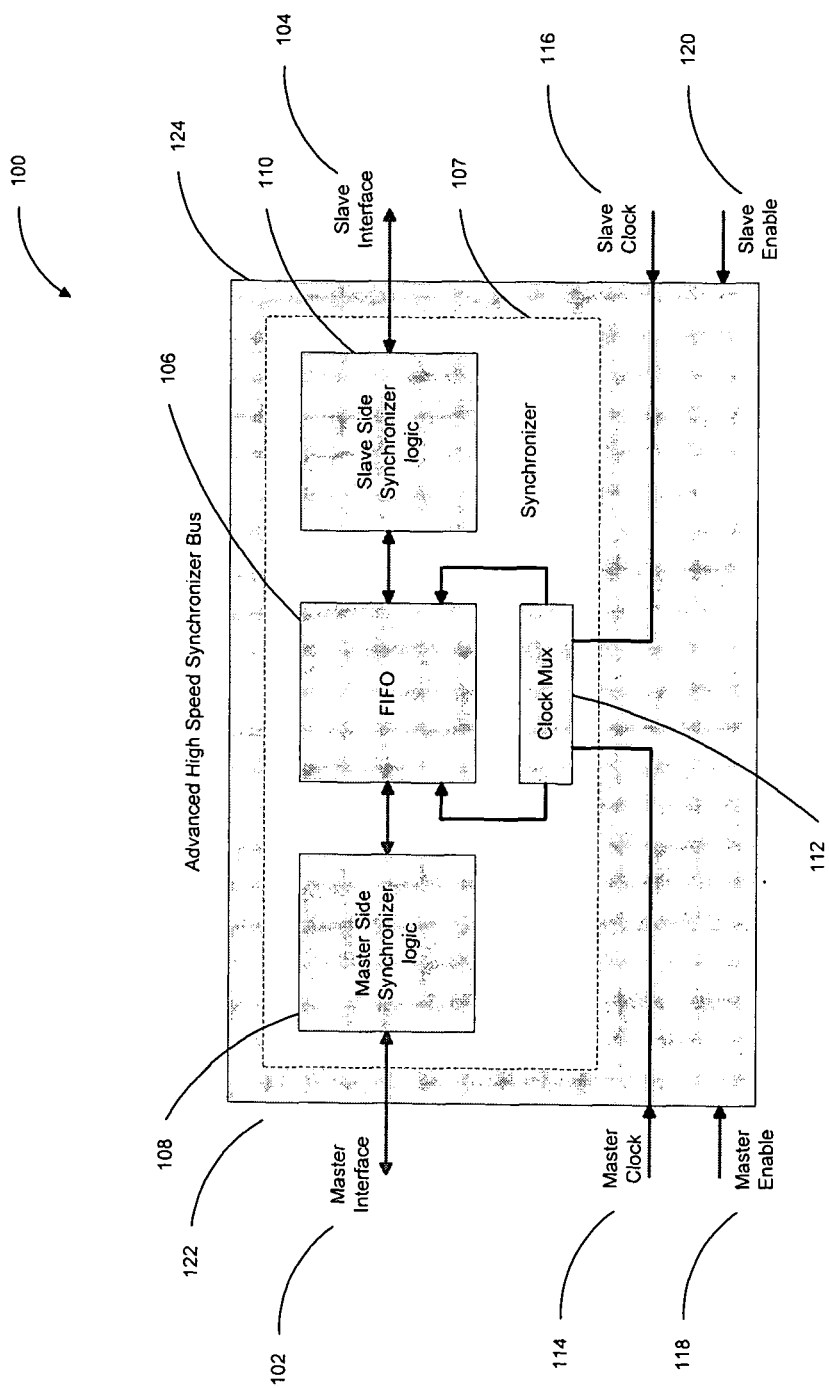
FIG. 1 is a block diagram of an exemplary synchronization system constructed in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, maybe implemented in many different embodiments of hardware, software, firmware, and/or the entities illustrated in the drawings. Any actual software code with the specialized controlled hardware to implement the present invention is not limiting of the present invention. Thus, the operational behavior of the present invention will be described with the understanding that modifications and variations of the embodiments are possible, given the level of detail presented herein.

Embodiments of the present invention are configured to preserve the burst transaction on both sides of an advanced high side synchronizer bus (AHB) to the greatest extent possible. The present invention provides an AHB based design with multiple clock domains that can be configured for minimum latency mode or maximum throughput mode to optimally configure the system's performance.

FIG. 1 is a block diagram of an exemplary AHB system 100 constructed in accordance with an embodiment of the present invention. In FIG. 1, the AHB system 100 includes a master interface 102 configured to receive and input data to a slave interface 104 via a first-in, first-out (FIFO) buffer 106 within a synchronizer 107. The data can be received on a master side and translated to a different clock domain, for example, on a slave side. A basic functional behavior of the AHB system 100 of FIG. 1 is to provide synchronization for master and slave slide clocks where a master clock 114 is synchronized with a slave clock 116. The clocks 114 and 116 can also be quasi or semi-synchronous. The clocks can have any relationship, for example, 1 to 1, 1-2, 1-3, or 1-N, N-1, N:M etc. Transfer from one clock domain to another clock domain is accomplished by providing clock enable signals, explained in greater detail below.

In FIG. 1, the AHB system 100 includes the synchronizer 107 including master side synchronizer logic 108, the FIFO 106, slave side synchronizer logic 110, and a clock multiplexer 112 for routing timing signals between the master clock 114 and the slave clock 116. Clock enable signals, including a master enable 118 and a slave enable 120, are used to qualify forward active transition edges from master clock domain to slave clock domain, or vice versa. The AHB system 100 of FIG. 1 is also capable of preserving bursts that go from a master side 122 to a slave side 124. The FIFO 106 enables preservation of this burst.

Preserving the burst provides better system performance by providing better throughput. In conventional systems, when a single access request is forwarded, the system must wait for a related command to come back and finish before sending another command. In the present invention, however, a burst preservation capability enables the transfer of an entire chunk of data of any length at once.

In the system 100 of FIG. 1, when the master side 122 is performing a read command, the synchronizer transitions to the slave side 124, obtains read data and feeds the read data back to master side 122 (all transparent to master side). From a slave side point of view, the slave side 124 views the synchronizer 107 as the master, where the synchronizer 107 provides all read/write commands and all data as the AHB system 100 is running in quasi-synchronous mode (i.e., semi-synchronous).

In order to preserve burst, the FIFO 106 allows storage of data until the FIFO 106 is full. By way of example, if the master side 122 is providing 16 beats of burst data to slave side 124, the AHB system 100 can capture all of the data in the FIFO 106. When the FIFO 106 is full, all transactions are drained to the slave side 124. If the AHB system 100 is bandwidth limited, for example, data can be transferred from the master side 122 into the FIFO 106 for temporary storage. Once all of the data has been received, it will be transferred to the slave side 124.

On the other hand, if bandwidth is not an issue and it is desirable to go from the master side 122 to a peripheral device (e.g., connected to slave side) quickly, the system 100 includes a latency mode where data can be pumped out as soon as it is received in order to minimize latency. The exemplary system 100 of FIG. 1 also includes a single access mode where the FIFO 106 can be bypassed all together.

Figure 2:
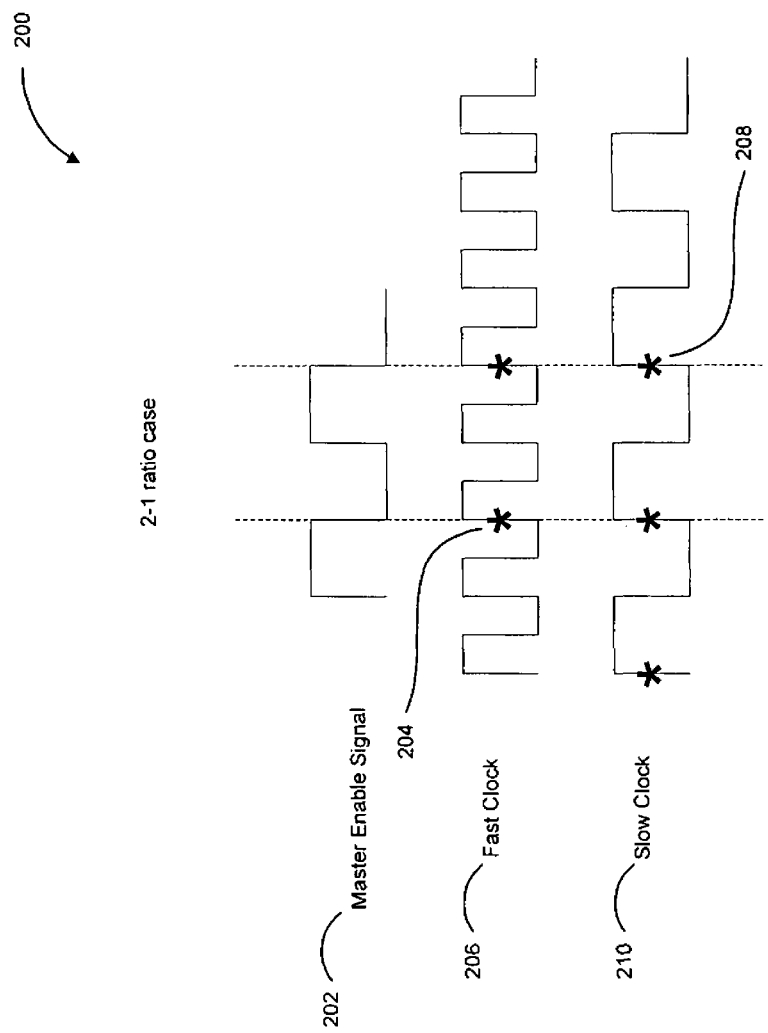
FIG. 2 is an illustration of an exemplary timing diagram for transferring data from one time domain to another time domain based upon a two to one clock ratio in accordance with the present invention.

FIG. 2 is an exemplary timing diagram 200 illustrating derivation of an enable signal for a simple 2-1 case. Clock enable signals within the AHB system 100 of FIG. 1 facilitate N:M data transfers. In the system 100, the master side 122, for example, will not capture every cycle of slave data because slave data might not be ready until changes occur along rising edges of the clock signal. Thus, enable signals are necessary to signal to one side (e.g., master side 122) that the other side (e.g., slave side 124) is not ready to transfer data. Enable signals also provide a proper timing protocol to transfer the data when the respective side is ready to transfer and/or receive the data.

In FIG. 2, a master enable signal 202 is used to indicate that there is adequate time between a clock edge 204 (of a fast clock 206) and a clock edge 208 (of a slow clock 210) to sample data. That is, the master enable signal 202 indicates that there is enough time to actually perform a transfer. Enable signals reside within a clock manager to ensure that data is transferred in a manner to give associated registers enough time to settle before the transfer can happen. This process is illustrated in greater detail in FIG. 3.

Figure 3:
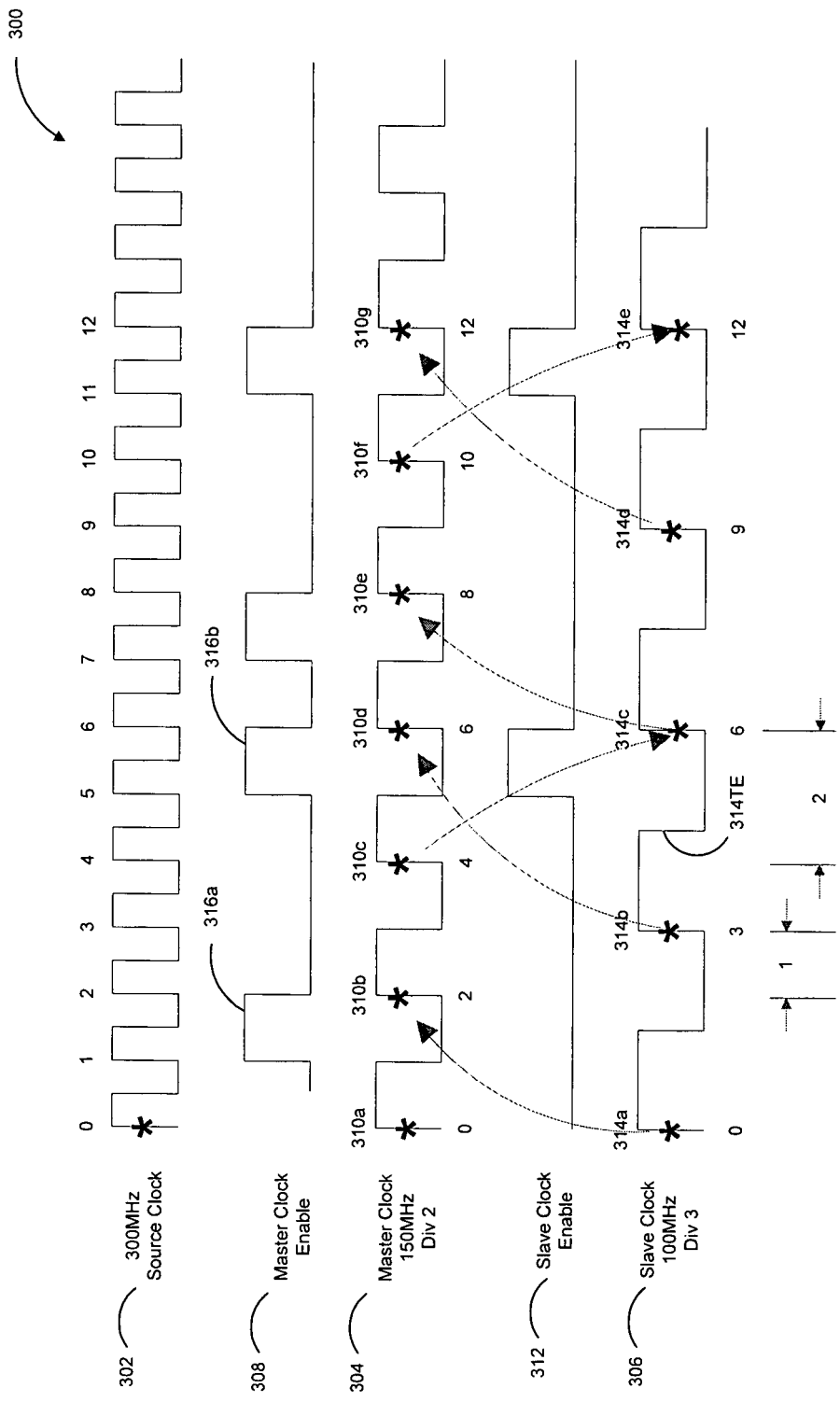
FIG. 3 is an illustration of an exemplary timing diagram for transferring data from one time domain to another time domain based upon an 3:2 clock ratio in accordance with the present invention.

FIG. 3 is an illustration of an exemplary timing diagram 300 for transferring data from one clock domain to another clock domain based upon an N:M (3:2 clock ratio shown in FIG. 3) clock ratio. The timing diagram 300 is contingent upon whether the FIFO 106 of FIG. 1 is executing a read command or a write command, although the FIFO 106 can accommodate both. If performing a write command, for example, data goes from master side 122 to the FIFO 106 and is drained to the slave side 124. If a read command is being performed, the FIFO 106 is filled by data flowing from slave side 124 and is drained by the master side 122. In the system 100, the FIFO 106 can be used for both read and write commands. The commands are all pipelined. Clocks are switched for FIFO modes so as to not need multiple sets of FIFOs.

The timing diagram 300 includes a 300 mega-hertz (MHz) source clock 302 having rising edgess 0-12. Also included is a master side clock signal 304 from a 150 MHz clock (i.e., master clock domain) and a slave side clock signal 306 from a 100 MHz clock (i.e., slave clock domain). The 150 MHz clock and the 100 MHz clock are known in the art as divide-down clocks. A master clock enable signal 308 is provided for enabling/disabling rising edges 310a-310g of the master side clock signal 304. Similarly, a slave clock enable signal 312 is provided for enabling/disabling rising edges 314a-314e of the slave side clock signal 306.

The master clock enable signal 308 can be used, for example, to qualify one (capturing edge) of the rising edges 310a-310g of the master side clock signal 304 to capture or receive data produced by one (launching edge) of the rising edges 314a-314e of the slave side clock signal 306. Similarly, the slave clock enable signal 312 can be used to qualify one of the rising edges 314a-314g to capture or receive data produced by one of the rising edges 310a-310g. This capturing and launching process is explained in greater detail below.

As a preliminary matter, in the exemplary illustration of FIG. 3, the rising edge 310a, of the master side clock signal 304, and the rising edge 314a, of the slave side clock signal 306, are aligned with the "0" edge of the source clock signal 302. Also, it can be observed that the rising edges 310b-310g are respectively aligned with the rising edges 2, 4, 6, 8, 10, and 12 of the source clock 302. Similarly, the rising edges 314b-314e of the slave side clock signal 306 are respectively aligned with the rising edges 3, 6, 9, and 12 of the source clock 302. The challenge, however, is ensuring, for example, that on a particular rising edge of the master side clock signal 304, a data transfer can be made from the 150 MHz clock domain to the 100 MHz clock domain, or vice versa.

For capturing or receiving data purposes, not all of the rising edges of the master side clock signal 304 are usable to capture data generated by the slave side clock signal 306. That is, if trying to use one of the rising edges 310a-310g of the master side clock signal 304 to capture or receive data produced by one of the rising edges 314a-314e of the slave side clock signal 306, not all of the rising edges 310a-310g are suitable for this purpose.

To capture data going from the slave side clock signal 306 to the master side clock signal 304, sufficient setup time is required from a launching edge of the slave clock signal 306 to a corresponding capturing edge of the master clock signal 304. That is, there is desirably at least one full cycle of the source clock 302 between a launching edge of the slave side clock signal 306 and a capturing edge of the master side clock signal 304. The clock enable signals 308 and 312 facilitate this process. An ideal enable signal (e.g., a master clock enable 308) will facilitate data transfer from the master side 122 to the slave side 124, regardless of the relationship between the master side clock signal 304 and the slave side clock signal 306, as noted above.

FIG. 3 is one example of how an enable signal can be used to accommodate such a transfer in accordance with the present invention. The enable signals qualify the transfer of data from slave clock domain to master clock domain and from master clock domain to slave clock domain. Timing arrangements similar to FIG. 3 can be constructed to accommodate clocks having any relationship.

In FIG. 3, for example, the rising edge 310b is suitable to capture data launched by the rising edge 314a, since two full clock cycles of the source clock 302 occur therebetween. Note, for example, that the rising edges "0" and "2" of the source clock signal 302 correspond with the rising edges 310a and 310b of the master side clock signal, respectively. The time between the rising edges "0" and "2" is equivalent to two full clock cycles of the source clock 302. As such, an occurrence of a falling edge 316a of the master enable signal 308 can be used to enable the rising edge 310b to capture the data from the leading 314a. More specifically, the falling edge 316a occurs to trigger rise of the rising edge 310b.

In another example, also illustrated in FIG. 3, the rising edge 310d of the master side clock signal 304 can be used to capture data from the rising edge 314b of the slave side clock signal 306 because two full clock cycles of the source clock 302 occur therebetween. However, the rising edge 310c is not suitable to capture data launched by the rising edge 314b because there is insufficient time to transfer all the data during this time. That is, at the time the rising edge 310c occurs, data launched by the rising edge 314b is continuing to be transmitted.

More specifically, the rising edge 310c occurs too early to capture all of the data launched by the rising edge 314b because transmission of the data triggered by the edge 314b does not end until occurrence of a falling edge 314TE of the slave side clock signal 306. Therefore, the master clock enable signal 308 is configured to disable the rising edge 310c. The master clock enable signal 308, however, is configured to enable the rising edge 310d. The rise in the rising edge 310d is triggered by occurrence of the falling edge 316b within the master clock enable signal 308. This pattern repeats for rising edges 314c and 314d, which launch data that is then captured by the rising edges 310e and 310g, respectively.

Although the examples discussed above apply to transferring data from the 100 MHz clock domain to the 150 MHz clock domain, this process also applies when transferring data from the 150 MHz clock domain to the 100 MHz clock domain.

By way of example, the rising edges 314c and 314e of the slave side clock signal 306 can be used to respectively capture data launched by the rising edges 310c and 310f of the master side clock signal 304. Thus, for purposes of transferring data from the 150 MHz clock domain to 100 MHz clock domain, the slave clock enable signal 312 is configured to enable only the rising edges 314c and 314e. As illustrated in FIG. 3, the rising edges 314a, 314b, and 314d are disabled by the slave clock enable signal 312.

Clock enable signals facilitate transferring data from one domain to another domain where clock ratio is N:M, while preserving the burst. Burst preservation is facilitated, for example, by the internal FIFO structure to facilitate dynamic clock N:M clock ratio. The enable signal provides higher speed to slower speed transfers or lower speed to higher speed transfers.

Figure 4:
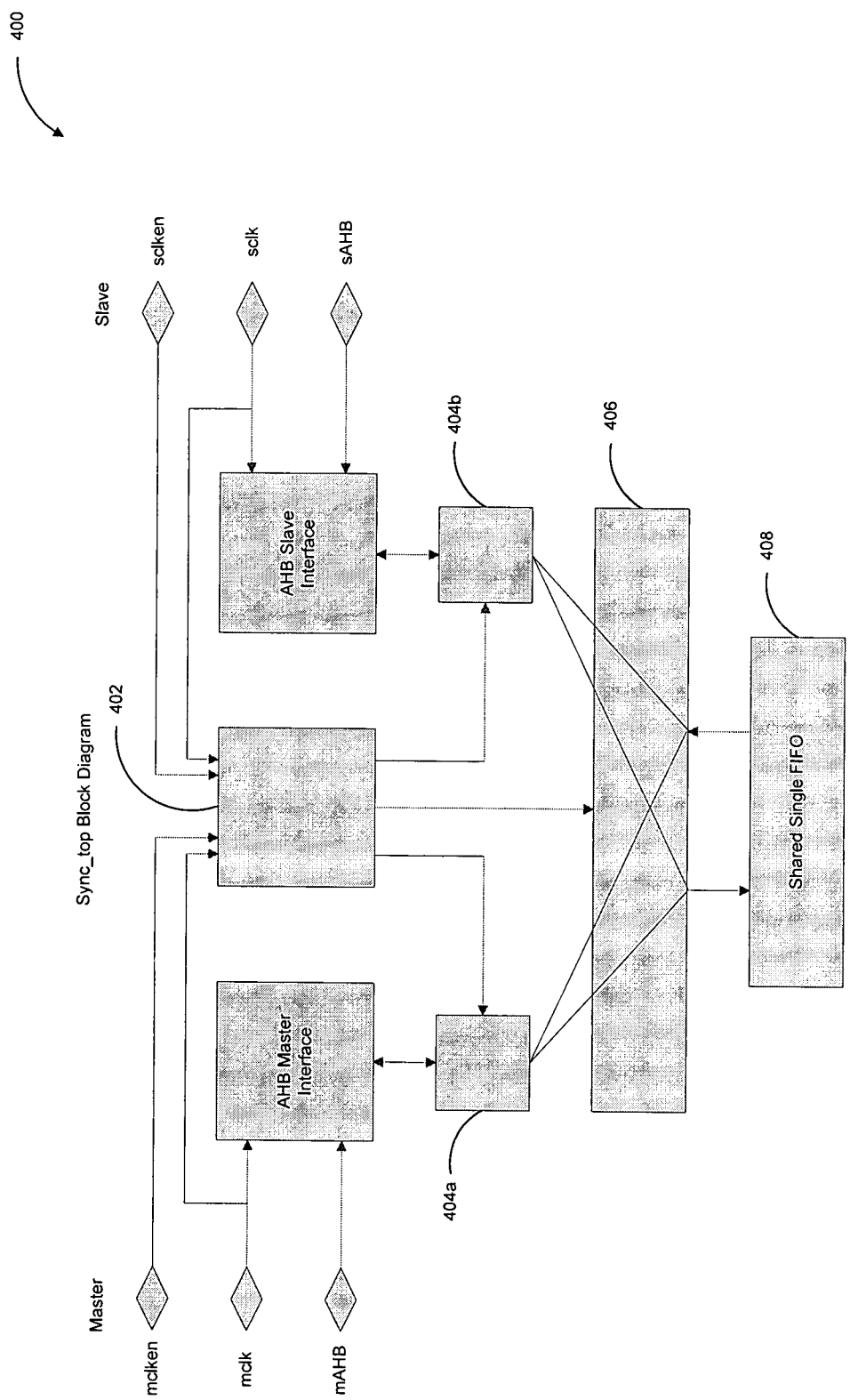
FIG. 4 is an alternative embodiment of the synchronization system of FIG. 1.

FIG. 4 is an alternative embodiment 400 of the AHB synchronization system 100 of FIG. 1. In FIG. 4, block 402 provides clock enables, synchronizes master to slave side at N:M clock ratio, where N and M are integers. Block 402 also provides dynamic switching of clock ratios. The block 402, can be, as an example, a synchronizer. Blocks 404a and 404b provide preservation of AHB burst transfer and switches between minimum latency mode and maximum bandwidth mode. Each of the block 404a and 404b can be, for example, AHB interface logic. Block 406 provides dynamic switching between AHB reads and writes using a single FIFO. The block 406 can be, for example, a multiplexer.

Figure 5:
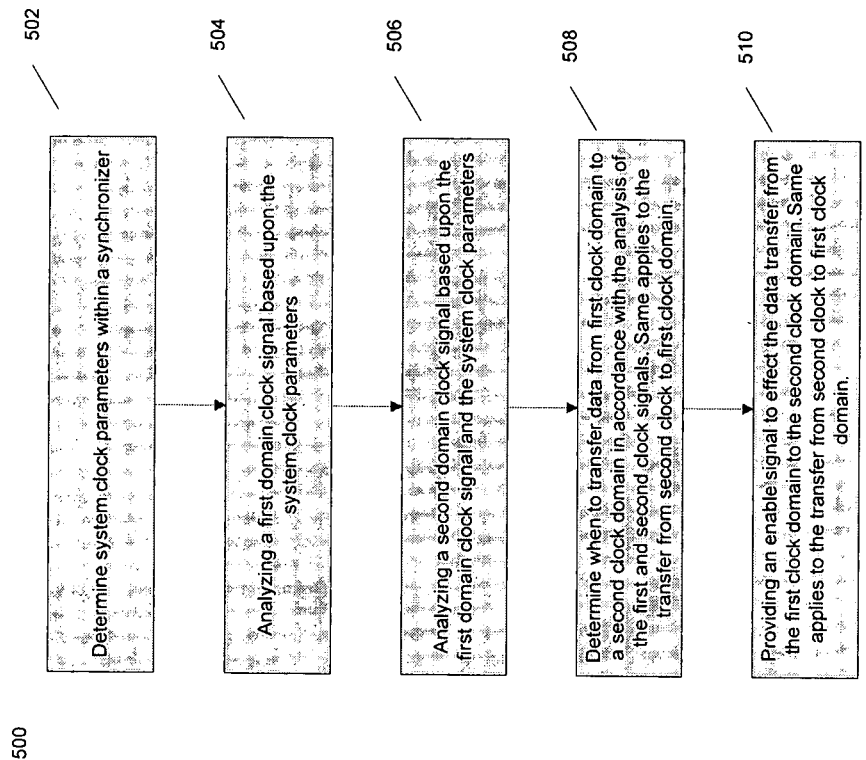
FIG. 5 is a flowchart of an exemplary method of practicing an embodiment of the present invention.

FIG. 5 is a flowchart of an exemplary method of practicing an embodiment of the present invention. More specifically, FIG. 5 is one embodiment of a method for transferring data from one clock domain within a synchronizer to another domain within the synchronizer. The method includes determining system clock parameters within the synchronizer and analyzing a first domain clock signal based upon the system clock parameters. Next, a second domain clock signal is analyzed based upon the first domain clock signal and the system clock parameters. A determination is made as to when to transfer data from a first clock domain to a second clock domain in accordance with the analysis of the first and second domain clock signals, and an enable signal is provided to affect the data transfer from the first domain to the second clock domain. The same is applied to data transfers from the second clock domain back to the first clock domain.

The present invention provides an AHB bus synchronizer to transfer data across different clock domains. There are existing solutions when two side clocks have 1:N synchronized or a totally unsynchronized relationship. The present invention efficiently synchronizes the AHB bus such that two side clocks have synchronized N:M ratio where N and M are any integer. The present invention preserves the burst transaction on both sides of AHB as much as possible. The design can also be configured in either minimum latency mode or maximum throughput mode to optimally configure the system.

Selected features of an embodiment of the present invention include (a) each synchronizer is uni-directional, having master and slave interfaces, (b) preservation of bursts as the data goes through the synchronizers, (c) clocks to the synchronizer have N:M ratio, including 1:1 ratio and are quasi-synchronous, and (d) either side can be fast or slow clocks. The clocks are generated with the same source and enables are provided for each clock to indicate a valid transfer edge.

The synchronizers have three operational modes, which can be programmed through the synchronizer control registers. A first of these three modes can be, for example, a bypass mode. In the bypass mode, clocks have a 1:1 ratio and are fully synchronous. The synchronizer logic is fully bypassed.

A second synchronizer mode is called bandwidth mode. In bandwidth mode, clocks have an N:M ratio and the synchronizer logic is not bypassed. The synchronizer transfers AHB access while maximizing bandwidth on the slave side. Single reads and writes do not utilize the FIFO in order to reduce latency. Burst read commands from the master are passed to the slave side immediately. Read data from the slave is stored in the FIFO. When the FIFO is filled, it is drained by the master side. Burst read commands with unknown-length from the master result in essentially immediate pre-fetch on the slave side. Pre-fetch length can be 1 to 16 and can be programmed through synchronizer control registers. The read data from slave is stored in the FIFO. As soon as the FIFO is filled, it is drained by the master side.

In the second synchronizer mode, burst writes from the master are stored in the FIFO. The transfer is controlled by beats of AHB burst. The slave side begins draining the FIFO if the FIFO is full or the last beat of burst write is presented on the master. During burst write, the synchronizer absorbs BUSY cycles presented on the master side. The synchronizer will not inject BUSY on the slave side. Any known size transaction on the master side results in the same transaction on the slave side. Any unknown-size burst transactions that have greater than 16 beats, for example, result in multiple 16-beat burst transactions on the slave side.

One additional synchronizer mode is the latency mode. In the latency mode, the clocks have an N:M ratio, the synchronizer logic is not bypassed, and the synchronizer transfers AHB access while minimizing latency to the slave side. In the latency mode, single reads and writes do not utilize the FIFO in order to reduce latency. Burst read commands from the master are passed to the slave side immediately. Read data from the slave slide is stored in the FIFO. When the FIFO is filled, it is drained by the master. Also in latency mode, burst read commands with unknown-length (INCR) from the master result in immediate pre-fetch on the slave side. Pre-fetch length is 1 to 16 and can be programmed through synchronizer control registers. The read data from slave is stored in the FIFO. As soon as the FIFO is filled, it is drained by the master side.

Burst writes from the master are stored in the FIFO. The FIFO pointers and programmable watermarks are used to control the data transfer to the slave side. Watermarks can be configured through the synchronizer control registers. The slave side starts draining the FIFO if: the FIFO write pointer reaches the watermark, the FIFO is full, or the last beat of the burst write is presented on the master.

During burst write, if slave side started draining the FIFO and the FIFO is starved, the synchronizer will inject BUSY cycles to the slave side. Generally, transactions on the master side results in the same type of transaction on the slave side.

By default, to maintain data coherency, writes (either single or burst) from the master side are not completed until the write transaction is completed on the slave side.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents

What is claimed is:

1. A method for transferring data from one clock domain within an advanced high performance bus synchronizer to another domain within the synchronizer while preserving burst operations, comprising:
   determining system clock parameters within the synchronizer;
   analyzing a first clock signal associated with a first clock domain based upon the system clock parameters;
   analyzing a second clock signal associated with a second clock domain based upon the first clock signal and the system clock parameters;
   switching an operational mode of the synchronizer based on a ratio of frequencies of the first and second clock signals, wherein the switching of the operational mode includes switching between a latency mode, a bandwidth mode, and a bypass mode, the bypass mode including bypassing a transfer of data between the first clock domain and the second clock domain and bypassing a transfer of data between the second clock domain and the first clock domain; and
   providing a second clock domain enable signal to enable a rising edge of the second clock signal to transfer data between the first clock domain and the second clock domain and a first clock domain enable signal to enable a rising edge of the first clock signal to transfer data between the second clock domain and the first clock domain.

2. The method of claim 1, wherein the analysis of the first clock signal includes locating the rising edge of the first clock signal.

3. The method of claim 2, wherein the analysis of the second clock signal includes locating the rising edge of the second clock signal.

4. The method of claim 1, wherein the first clock domain is a master clock domain; and
   wherein the second clock domain is a slave clock domain.

5. An apparatus for transferring data from one clock domain within an advanced high performance bus synchronizer to another domain within the synchronizer while preserving burst operations, comprising:
   means for determining system clock parameters within the synchronizer;
   means for analyzing a first clock signal associated with a first clock domain based upon the system clock parameters;
   means for analyzing a second clock signal associated with a second clock domain based upon the first clock signal and the system clock parameters;
   means for switching an operational mode of the synchronizer based on a ratio of frequencies of the first and second clock signals, wherein the means for switching is configured to switch between a latency mode, a bandwidth mode, and a bypass mode based on the ratio of frequencies, the bypass mode including bypassing a transfer of data between the first clock domain and the second clock domain and bypassing a transfer of data between the second clock domain and the first clock domain; and
   means for providing a second clock domain enable signal to enable a rising edge of the second clock signal to transfer data between the first clock domain and the second clock domain and a first clock domain enable signal to enable a rising edge of the first clock signal to transfer data between the second clock domain and the first clock domain.

6. The apparatus of claim 5, wherein an analysis of the first clock signal includes locating the rising edge of the first clock signal.

7. The apparatus of claim 6, wherein the analysis of the second clock signal includes locating the rising edge of the second clock signal.

8. The apparatus of claim 5, wherein the first clock domain is a master clock domain; and
   wherein the second clock domain is a slave clock domain.

9. The method of claim 1, wherein a falling edge of the second clock domain enable signal enables the transfer of the data between the first clock domain and the second clock domain, and wherein a falling edge of the first clock domain enable signal enables the transfer of the data between the second clock domain and the first clock domain.

10. The method of claim 1, wherein a falling edge of the second clock domain enable signal enables a rising edge of the second clock signal to capture the data transferred between the first clock domain and the second clock domain from a rising edge of the first clock signal.

11. The method of claim 10, wherein the falling edge of the second clock domain enable signal is aligned with the rising edge of the second clock signal that captures the data from the rising edge of the first clock signal.

12. The method of claim 1, wherein a falling edge of the first clock domain enable signal enables a rising edge of the first clock signal to capture the data transferred between the second clock domain and the first clock domain from a rising edge of the second clock signal.

13. The method of claim 12, wherein the falling edge of the first clock domain enable signal is aligned with the rising edge of the first clock signal that captures the data from the rising edge of the second clock signal.

14. The apparatus of claim 5, wherein a falling edge of the second clock domain enable signal enables the transfer of the data between the first clock domain and the second clock domain, and wherein a falling edge of the first clock domain enable signal enables the transfer of the data between the second clock domain and the first clock domain.

15. The apparatus of claim 5, wherein a falling edge of the second clock domain enable signal enables a rising edge of the second clock signal to capture the data transferred between the first clock domain and the second clock domain from a rising edge of the first clock signal.

16. The apparatus of claim 15, wherein the falling edge of the second clock domain enable signal is aligned with the rising edge of the second clock signal that captures the data from the rising edge of the first clock signal.

17. The apparatus of claim 5, wherein a falling edge of the first clock domain enable signal enables a rising edge of the first clock signal to capture the data transferred between the second clock domain and the first clock domain from a rising edge of the second clock signal.

18. The apparatus of claim 17, wherein the falling edge of the first clock domain enable signal is aligned with the rising edge of the first clock signal that captures the data from the rising edge of the second clock signal.

19. An apparatus for transferring data from one clock domain within an advanced high performance bus synchronizer to another domain within the synchronizer while preserving burst operations, comprising:
   means for determining system clock parameters within the synchronizer;
   means for analyzing a first clock signal associated with a first clock domain based upon the system clock parameters;
   means for analyzing a second clock signal associated with a second clock domain based upon the first clock signal and the system clock parameters; and
   means for providing a second clock domain enable signal to enable a rising edge of the second clock signal to transfer data between the first clock domain and the second clock domain, and a first clock domain enable signal to enable a rising edge of the first clock signal to transfer data between the second clock domain and the first clock domain, the means for providing being configured to operate in a bypass mode, a bandwidth mode, and a latency mode, wherein the bypass mode includes bypassing the transfer of the data between the first clock domain and the second clock domain and bypassing the transfer of the data between the second clock domain and the first clock domain; wherein the bandwidth mode includes maximizing bandwidth of the synchronizer; and wherein the latency mode includes minimizing latency in the synchronizer.

\* \* \* \* \*